United States Patent
Tascione et al.

(10) Patent No.: US 10,137,903 B2
(45) Date of Patent: Nov. 27, 2018

(54) AUTONOMOUS VEHICLE DIAGNOSTIC SYSTEM

(71) Applicant: Uber Technologies, Inc., San Francisco, CA (US)

(72) Inventors: Daniel Tascione, Pittsburgh, PA (US); Michael Bode, Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 15/238,093

(22) Filed: Aug. 16, 2016

(65) Prior Publication Data

US 2018/0050704 A1 Feb. 22, 2018

(51) Int. Cl.
| | | |
|---|---|---|
| *B60W 50/02* | (2012.01) | |
| *G07C 5/08* | (2006.01) | |
| *G05D 1/00* | (2006.01) | |
| *B60W 50/08* | (2012.01) | |

(52) U.S. Cl.
CPC .... *B60W 50/0205* (2013.01); *B60W 50/0225* (2013.01); *B60W 50/082* (2013.01); *G05D 1/0061* (2013.01); *G05D 1/0088* (2013.01); *G07C 5/0808* (2013.01); *G07C 5/0841* (2013.01); *B60W 2050/0215* (2013.01); *B60W 2420/42* (2013.01); *B60W 2420/52* (2013.01); *B60W 2550/402* (2013.01)

(58) Field of Classification Search
None
See application file for complete search history.

(56) References Cited

U.S. PATENT DOCUMENTS

| | | | |
|---|---|---|---|
| 9,315,178 B1* | 4/2016 | Ferguson | B60T 17/221 |
| 9,566,986 B1* | 2/2017 | Gordon | B60W 50/12 |
| 2007/0005202 A1* | 1/2007 | Breed | B60W 50/0205 701/29.1 |
| 2014/0149806 A1* | 5/2014 | Khalastchi | G06K 9/00496 714/49 |
| 2015/0198136 A1* | 7/2015 | Martin | F02D 41/009 356/72 |
| 2017/0263060 A1* | 9/2017 | Sukumaran | G07C 5/0808 |
| 2018/0025558 A1* | 1/2018 | Chen | G07C 5/0808 |

OTHER PUBLICATIONS

Robert Oshana & Mark Kraeling, Software Engineering for Embedded Systems: Methods, Practical Techniques, and Applications (2013) (Year: 2013).*

* cited by examiner

*Primary Examiner* — Tamara L Weber
(74) *Attorney, Agent, or Firm* — Mahamedi IP Law LLP

(57) ABSTRACT

An on-board diagnostic system for an autonomous vehicle can receive diagnostic data from any number of AV systems of the AV. For each AV system the on-board diagnostic system can determine whether the diagnostic data indicates that the AV system is operating nominally. In response to determining a fault condition of an AV system, the on-board diagnostic system can initiate a procedure associated with the respective AV system to resolve the fault condition.

18 Claims, 5 Drawing Sheets

AUTONOMOUS VEHICLE DIAGNOSTIC SYSTEM

BACKGROUND

Vehicle control units can include various closed loop systems that monitor, manipulate, and/or operate a vehicle's control systems. For example, on-board vehicle electronic control units (ECUs) can monitor and manage the vehicle's engine performance with a set of operation parameters, managing intake manifold pressure, mass airflow, fuel injection, engine temperature, crankshaft reference position, battery voltage, throttle position, engine knock, oxygen concentration, and the like. The on-board ECU can further monitor and manage chassis control systems, such as brake pressure control and wheel slippage, transmission control (e.g., automatic clutch and throttle), chassis and wheel acceleration, steering shaft torque, power steering, steer assistance, vehicle deceleration (e.g., for airbag control), traction control, tire pressure, hydraulic systems, damping control, door control, speed control, telematics control (e.g., a GPS system), and the like.

Autonomous vehicle (AV) technology significantly increases computing power and complexity of vehicle control systems, providing a suite of multiple sensor systems as well as an on-board sensor data processing system for autonomous operation of the vehicle. For example, current AVs utilize sensor data from precisely calibrated LIDAR sensors, cameras, radar systems, and other sensors to continuously process a complete sensor view of the surroundings of the AV in order to safely navigate through traffic on public roads and highways. Thus, any misalignment, failure, or fault condition with a particular sensor system can affect the perception and planning of the AV to a certain degree.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
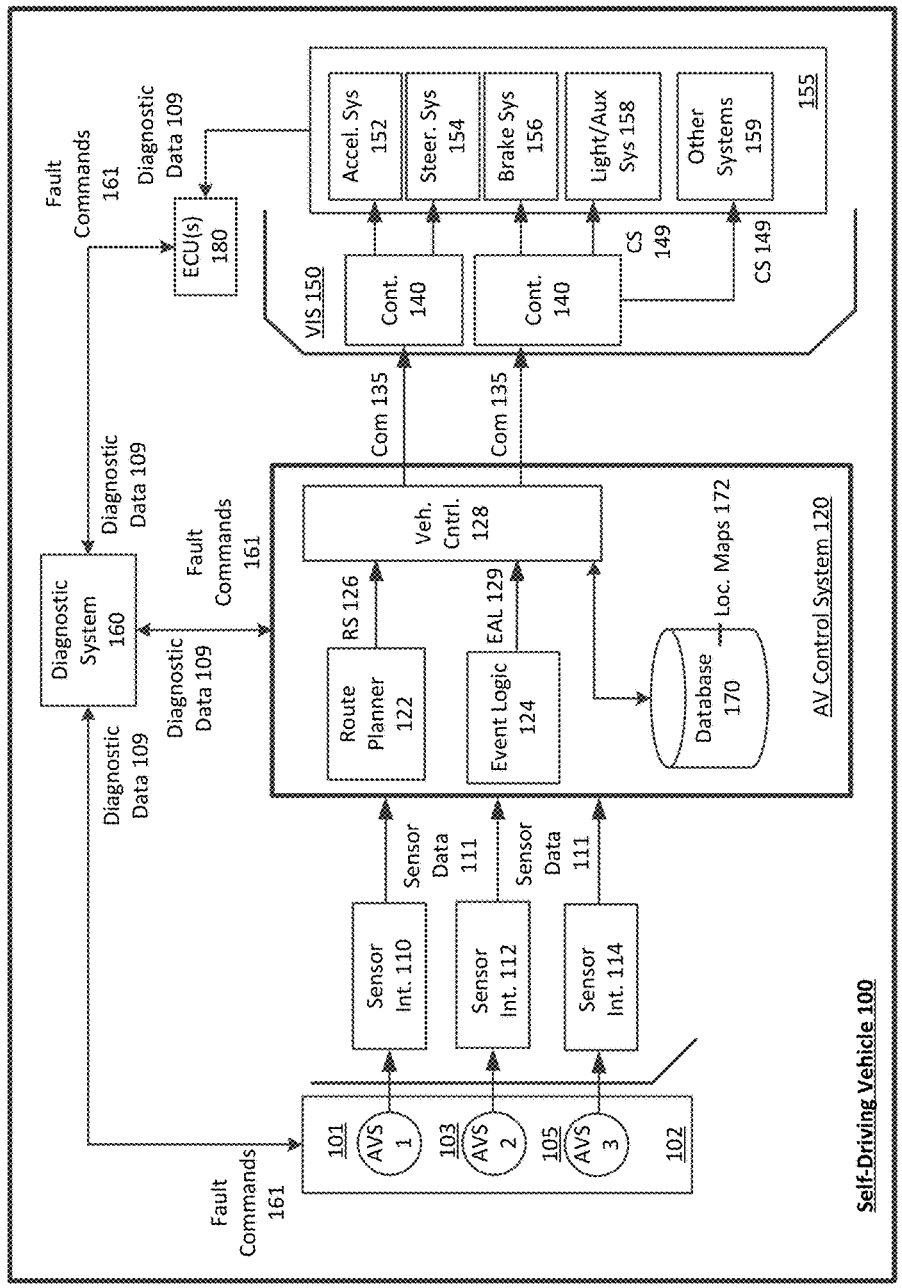
FIG. 1 is a block diagram illustrating an example autonomous vehicle (AV) or self-driving vehicle (SDV) implementing a control system, as described herein.

An on-board diagnostic system for an autonomous vehicle (AV) is provided herein that can independently monitor and manage all of the AV systems. Such AV systems can include each of the sensor systems, such as the AV's LIDAR sensors, monocular and stereoscopic camera systems, radar system, telematics system, autonomous control system, and the like. In certain implementations, the diagnostic system can further monitor the AV's on-board electronic control unit(s) (ECU), which itself can monitor various vehicle systems, such as the engine performance and temperature, chassis control (e.g., steering, braking, and acceleration control assist units), motor generator units (MGUs) (e.g., regenerative braking, turbo energy recovery system, etc.). The on-board diagnostic system can receive and aggregate diagnostic data from a plurality of AV systems. The AV systems can include sensor systems, such as an on-board LIDAR system, camera system, radar system, sonar system, infrared sensor systems, and the like. For each respective AV system of the plurality of AV systems, the on-board diagnostic system can determine whether the diagnostic data indicate that the respective AV system is operating within a corresponding set of tolerance ranges for the respective AV system.

In response to determining a fault condition corresponding to the respective AV system not operating within the corresponding set of tolerance ranges, the on-board diagnostic system can initiate a procedure (e.g., a component-specific resolution hierarchy) to resolve or mitigate the fault condition. As provided herein, the procedure may be dependent on the specific fault condition for the AV system. For example, if the spin rate of the LIDAR drops below a certain threshold, the on-board diagnostic system can initially attempt to resolve the spin rate fault. This can include transmitting a fault message to the LIDAR system, which can cause the LIDAR to increase its spin rate to within a normal operation range, or can cause the LIDAR system to cycle its power. Furthermore, the on-board diagnostic system can store or otherwise access safety guidelines and/or hierarchies for each particular parameter of each AV system. For example, the diagnostic system can monitor the LIDAR's spin rate, laser power, laser frequency, laser and/or photodetector alignment, axial alignment, and the like.

As another example, the on-board diagnostic system can monitor the AV's individual camera systems for such factors as alignment or field of view, frame rate, modes, ISO settings, lens debris, and the like. For each monitored parameter, the on-board diagnostic system can dynamically compare the parameter to a preconfigured tolerance range. A fault condition can result when any particular parameter of any monitored AV system falls outside of the normal ranges. Thus, when debris is collected on the camera lenses of the AV, the on-board diagnostic system can identify a blockage area of the debris, and/or a blockage location on the lens to determine whether the fault condition adversely affects the perception operations of the AV beyond a certain threshold. In some examples, the diagnostic system can cycle a camera lens filter when blockage is detected. In variations, if the debris remains, the diagnostic system can deprioritize image data from the blocked camera.

As described herein, the on-board diagnostic system can comprise an independent system separate from the vehicle's ECUs, and can also receive diagnostic data from the ECUs themselves to monitor the vehicle's engine, electric motor, transmission, and/or chassis performance (e.g., steering, brakes, acceleration, hydraulics, component temperatures, etc.). The on-board diagnostic system can further monitor the performance and temperature of the AV control system, which processes the sensor data to make route decisions and ultimately operate the AV's acceleration, braking, and steering systems autonomously. In various examples, the AV control system can comprise any number of processor cores, blade servers, or field programmable gate arrays (FPGAs) that operate to process live sensor data from the AV's sensor systems (e.g., LIDAR(s), camera(s), radar(s), etc.) in relation to stored localization maps and/or sub-maps to dynamically identify any potential obstacles or hazards while autonomously operating the AV along a given route. The on-board diagnostic system can monitor control system performance and operating temperatures in order to, for example, regulate a cooling system for the AV control system.

In implementing the safety or troubleshooting procedures for certain AV systems that are detected to be operating outside nominal ranges, the on-board diagnostic system can initially perform a default operation, such as confirming the fault condition and, if confirmed, resetting or power cycling the concerning AV system. If power cycling the AV system does not resolve the fault condition, then the on-board diagnostic system can make a series of determinations of whether the fault condition is critical to the safe autonomous operation of the AV, whether the fault condition can somehow be resolved otherwise, whether the fault condition can be mitigated (e.g., through utilization of other AV systems), whether traveling to a home location is most prudent, or whether a handoff to a human driver is necessary. In some examples, if the fault condition is not resolvable, the on-board diagnostic system can still determine that autonomous operation is minimally affected. For example, a failure of a single proximity sensor of the AV may not affect the perception and planning operations of the AV sensors and control system. Thus, the diagnostic system can flag the failure to be logged in an on-board database for repair during a next scheduled service. Accordingly, the on-board diagnostic system can monitor and manage the AV systems, resolve and/or mitigate any fault conditions detected for the AV systems, and override the AV control system to either cause the AV control system to route the AV to a home location, pull the AV over to the side of the road (e.g., stop the AV at a nearest safe location), or hand over control of the AV to a licensed human operator.

Among other benefits, the examples described herein achieve a technical effect of independently monitoring and managing all autonomous vehicle (AV) systems by aggregating diagnostic data from the AV systems and identifying any fault conditions corresponding to a respective AV system operating outside normal operating ranges. Furthermore, the on-board diagnostic system can implement safety operations in order to attempt to resolve or mitigate any detected fault conditions to continue autonomous drive, or determine whether to implement a recovery mode to have the fault condition resolved by a technician.

As used herein, a computing device refers to devices corresponding to desktop computers, cellular devices or smartphones, personal digital assistants (PDAs), laptop computers, tablet devices, virtual reality (VR) and/or augmented reality (AR) devices, wearable computing devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as those carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Numerous examples are referenced herein in context of an autonomous vehicle (AV) or self-driving vehicle (SDV). An AV or SDV refers to any vehicle which is operated in a state of automation with respect to steering and propulsion. Different levels of autonomy may exist with respect to AVs and SDVs. For example, some vehicles may enable automation in limited scenarios, such as on highways, provided that drivers are present in the vehicle. More advanced AVs and SDVs can drive without any human assistance from within or external to the vehicle.

System Description

FIG. 1 is a block diagram illustrating an example AV or SDV implementing a control system, as described herein. In an example of FIG. 1, a control system 120 can autonomously operate the SDV 100 in a given geographic region for a variety of purposes, including transport services (e.g., transport of humans, delivery services, etc.). In examples described, an autonomously driven vehicle can operate without human control. For example, in the context of automobiles, an autonomously driven vehicle can steer, accelerate, shift, brake, and operate lighting components. Some variations also recognize that an autonomous-capable vehicle can be operated either autonomously or manually.

According to some examples, the control system 120 can utilize specific sensor resources in order to intelligently operate the vehicle 100 in most common driving situations. For example, the control system 120 can operate the vehicle 100 by autonomously operating the steering, acceleration, and braking systems of the vehicle 100 to a specified destination. The control system 120 can perform vehicle control actions (e.g., braking, steering, accelerating) and route planning using sensor information, as well as other inputs (e.g., transmissions from remote or local human operators, network communication from other vehicles, etc.).

In an example of FIG. 1, the control system 120 includes a computer or processing system which operates to process sensor data that is obtained on the vehicle 100 with respect to a road segment upon which the vehicle 100 operates. The sensor data can be used to determine actions which are to be performed by the vehicle 100 in order for the vehicle 100 to continue on a route to a destination. In some variations, the control system 120 can include other functionality, such as wireless communication capabilities, to send and/or receive wireless communications with one or more remote sources. In controlling the vehicle 100, the control system 120 can issue commands 135 to control various electromechanical interfaces of the vehicle 100. The commands 135 can serve to control operational components 155 of the vehicle 100, including the vehicle's acceleration system 152, steering system 154, braking system 156, and auxiliary systems 158, and various other systems 159 (e.g., interior displays, climate control, seat positioning, interior lighting, etc.).

The SDV 100 can be equipped with multiple types of sensors 101, 103, 105 which can combine to provide a computerized perception of the space and the physical environment surrounding the vehicle 100. Likewise, the control system 120 can operate within the SDV 100 to receive sensor data 111 from the collection of sensors 101, 103, 105 and to control the various operational components 155 of the vehicle 100 in order to autonomously operate the SDV 100.

In more detail, the sensors 101, 103, 105 operate to collectively obtain a complete sensor view for the vehicle 100, and further to obtain situational information proximate to the vehicle 100, including any potential hazards or obstacles. By way of example, the sensors 101, 103, 105 can include multiple sets of cameras systems (video cameras, stereoscopic cameras or depth perception cameras, long range cameras), remote detection sensors such as provided by radar or LIDAR, proximity or touch sensors, and/or sonar sensors. According to examples provided herein, the sensors can be arranged or grouped in a sensor array 102 (e.g., in a sensor pod on the roof of the SDV 100) comprising any number of LIDAR, radar, monocular camera, stereoscopic camera, sonar, infrared, or other active or passive sensor systems.

Each of the sensors 101, 103, 105 can communicate with the control system 120 utilizing a corresponding sensor interface 110, 112, 114. Each of the sensor interfaces 110, 112, 114 can include, for example, hardware and/or other logical components which are coupled or otherwise provided with the respective sensor. For example, the sensors 101, 103, 105 can include a video camera and/or stereoscopic camera set which continually generates image data of the physical environment of the vehicle 100. As an addition or alternative, the sensor interfaces 110, 112, 114 can include dedicated processing resources, such as provided with field programmable gate arrays (FPGAs) which can, for example, receive and/or process raw image data from the camera sensor.

In some examples, the sensor interfaces 110, 112, 114 can include logic, such as provided with hardware and/or programming, to process sensor data 111 from a respective sensor 101, 103, 105. According to one implementation, the vehicle interface subsystem 150 can include a number of controllers 140 that process the control commands 135 generated by the AV control system 120. Based on the control commands 135, the controllers 140 can generate control signals 149 executable on the operational systems 155 of the SDV 100, such as the acceleration system 152, steering system 154, and braking system 156.

Accordingly, the controllers 140 can utilize the commands 135 as input to control propulsion, steering, braking, and/or other vehicle behavior while the AV control system 120 processes the sensor view provided by the sensor data 111 along a current route. Thus, the vehicle 100 can be actively driven along the current route as the controllers 140 continuously adjust and alter the movement of the vehicle 100 in response to receiving continuous sets of control commands 135 from the control system 120. Absent events or conditions which affect the confidence of the vehicle 120 in safely progressing along the route, the control system 120 can generate additional commands 135 from which the controller(s) 140 can generate various vehicle control signals 149 for the different operational components 155 of the SDV 100.

According to examples, the commands 135 can specify actions to be performed by the vehicle 100. The actions can correlate to one or multiple vehicle control mechanisms (e.g., steering mechanism 154, brakes 156, etc.). The commands 135 can specify the actions, along with attributes such as magnitude, duration, directionality, or other operational characteristics of the vehicle 100. By way of example, the commands 135 generated from the control system 120 can specify a relative location of a road segment which the SDV 100 is to occupy while in motion (e.g., changing lanes, moving into a center divider or towards a shoulder, turning the vehicle, etc.). As other examples, the commands 135 can specify a speed, a change in acceleration (or deceleration) from braking or accelerating, a turning action, or a state change of exterior lighting or other components. The controllers 140 can translate the commands 135 into control signals 149 for a corresponding operational system 155 of the SDV 100. The control signals 149 can take the form of electrical signals which correlate to the specified vehicle action by virtue of electrical characteristics that have attributes for magnitude, duration, frequency or pulse, or other electrical characteristics.

In an example of FIG. 1, the control system 120 can include a route planner 122, event logic 124, and vehicle control logic 128. The vehicle control logic 128 can convert alerts of event logic 124 ("event alert 129") into commands 135 that specify a set of vehicle actions. Furthermore, in operating the acceleration 152, braking 156, and steering systems 154 of the SDV 100, the control system 120 can include a database 170 that stores previously recorded and processed localization maps 172 of a given road segment or region. These localization maps 172 can comprise environmental characteristics, persistent identifying features (e.g., sidewalks, road signs, fire hydrants, parking meters, lamp posts, power lines, individual buildings, lane markers, traffic signals, trees, and other reference markers), and road and lane characteristics of individual road segments throughout a given region. For example, the AV control system 120 can reference a "current" localization map 172, which can include precisely mapped information of a current road segment on which the SDV is traveling in order to dynamically process the sensor data 111 to identify and/or classify any potential obstacles or hazards.

The route planner 122 can select one or more route segments 126 that collectively form a path of travel for the SDV 100 when the vehicle 100 is on a current trip (e.g., servicing a pick-up request or otherwise transporting a rider to a destination). In one implementation, the route planner 122 can specify route segments 126 of a planned vehicle path which defines turn by turn directions and lane selections for the vehicle 100 at any given time during the trip. In some examples, the route planner 122 may utilize the sensor interface 110 to receive GPS information as sensor data 111. The vehicle control 128 can process route updates from the route planner 122 as commands 135 to progress along a path or route and make individual lane changes using default driving rules and actions (e.g., moderating steering and speed).

In certain implementations, the event logic 124 can trigger low level responses to detected events. A detected event can correspond to a roadway condition, obstacle, or object of interest which, when detected, poses a potential hazard or threat of collision to the vehicle 100. By way of example, a detected event can include an object in the road segment, heavy traffic ahead, and/or wet conditions or other environmental conditions on the road segment. The event logic 124 can use sensor data 111 from cameras, LIDAR, radar, sonar, or various other components of the sensor array 102 in order to detect the presence of such objects as described. For example, the event logic 124 can detect potholes, debris, other vehicles, pedestrians, bicyclists, curbs, objects projected to be on a collision trajectory, and the like. Thus, the event logic 124 can detect events which enable the control system 120 to make immediate decisions (e.g., to accelerate, brake, or change lanes) to avoid any potential incidents while operating on public roads.

When events are detected, the event logic 124 can signal an event alert 129 that classifies or scores the event and indicates the type of action to be performed. Additionally, the control system 120 can determine whether an event corresponds to a potential incident with a human driven vehicle, a pedestrian, or other human entity external to the SDV 100. In turn, the vehicle control 128 can determine a low level response based on a score or classification of the event alert 129. Such response can correspond to an event avoidance action, or an action that the vehicle 100 can perform to maneuver the vehicle 100 based on the detected event in light of its score or classification. In certain implementations, the event alert 129 can be processed by the vehicle control 128 in order to slow down, accelerate, swerve, make a turn, pull over, or change lanes. In addition, the vehicle control 128 response can include a slight or sharp vehicle maneuver for avoidance using a steering control mechanism 154 and/or braking component 156. The event avoidance action can be signaled through the commands 135 for controllers 140 of the vehicle interface subsystem 150.

According to examples described herein, SDV 100 can include a diagnostic system 160 that can receive diagnostic data 109 from each of the AV systems, such as the sensor system 102 (e.g., each individual sensor 101, 103, 105 of the SDV 100), the AV control system 120 (e.g., processor performance data, and cooling system data), and the electronic control unit(s) 180 of the SDV 100. In some examples, the SDV 100 can be a modified human-driven vehicle that includes original equipment manufacturer (OEM) ECUs, which monitor the various operational systems 155 of the vehicle 100. These operational systems 155 can include the vehicle's engine or electrical motor, transmission, fuel/power delivery system 152, motor generator systems (e.g., kinetic energy recovery system, exhaust heat recovery system, power deployment systems, etc.), steering system 154, braking system 156, lighting and auxiliary systems 158, tire pressure sensors, media control unit, other interior interfaces, seat control, blind spot detection system, communications systems, speed control unit, hydraulic pressure sensors, engine/motor cooling system, air conditioning system, battery or battery pack, battery pack cooling system, and the like. In some examples, each operational system 155 of the vehicle 155 can include its own dedicated control unit 180. In variations, the vehicle can include a centralized on-board electronic control unit 180 that monitors and/or manages some, most, or all of the operational systems 155 of the vehicle. In most implementations, the ECU 180 remains relatively passive in diagnosing and logging any potential faults that occur on the vehicle. In some examples, the faults can be presented to the driver or passenger of the vehicle (e.g., as a dashboard fault light). In variations, during servicing, a technician can plug in a computer executing diagnostic software to monitor vehicle performance and access any faults logged in an on-board data log. Such faults can be relatively minor, such as a burnt out fog light bulb, or relatively major, such as low hydraulic pressure in the vehicle's brake system 156.

In such adapted vehicles, the diagnostic system 160 can receive diagnostic data 109 from the OEM ECU(s) 180 of the vehicle 100, whether configured as a centralized ECU or a number of dedicated ECUs corresponding to individual operational systems 155 of the vehicle 100. For purpose-built, fully integrated SDVs 100 (i.e., SDVs that are not retrofitted human-drive vehicles), the diagnostic system 160 can serve as a replacement for the central ECU 180, or a replacement for any number of the dedicated ECUs 180 of a traditional human-driven vehicle. Thus, the diagnostic system 160 can receive diagnostic data 109 from each of the sensor systems 102, the AV control system 120, and the various operational systems 155 of the SDV 100.

According to examples described herein, the diagnostic system 160 can compare the diagnostic data 109 from each respective AV system to normal operational ranges for that respective AV system. For example, the diagnostic data 109 from the sensor systems 102 can include data indicating the spin rate of the LIDAR, the power used by the LIDAR's laser(s), the frequency settings of the laser(s), power data from each of the LIDAR's photodetectors, and the like. Diagnostic data 109 from the AV control system 120 can also indicate whether a failure or fault condition has occurred with the LIDAR. For example, a misalignment between the lasers and the photodetectors from the LIDAR can cause the AV control system 120 to require increased processing speed and/or time in order to resolve and positively identify objects within its sensor view.

As another example, the diagnostic data 109 can indicate a failure of a photodetector, a laser failure, a camera failure, debris on a camera lens, a camera component failure (e.g., aperture, light sensitivity response, zoom component, etc.), radar or radar component failure, sonar or sonar component failure, diminished or degraded capability of any of the sensor systems 102 or components thereof, strained or degraded performance by the AV control system 120, overheating of the AV control system 120, processor core failures, cooling fan faults or failures (e.g., for air cooled systems), cooling pump faults or failures (e.g., for liquid cooled systems), air compressor, evaporator, or condenser failures, and the like. Still further, the diagnostic data 109 from the operational components 155 of the vehicle 100, or the ECU(s) 180, can indicate any fault conditions with the vehicle's power unit and chassis control systems—from minor bulb or sensor failures, wheel misalignment, or fuel/power consumption information, to relatively major hydraulic fluid leaks, tire failures, or broken components. Thus, the diagnostic data 109 can be received by the diagnostic system 160 from any number of AV systems.

When a particular fault condition is identified, the diagnostic system 160 can initiate a safety protocol for that particular fault condition. Such safety protocols can cause the diagnostic system 160 to attempt to resolve the fault condition, mitigate the fault condition, log the fault condition for a future servicing process, cause the AV control system 120 to pull over the vehicle 100, drive to a home location, and/or initiate a handover process to a human driver. In some examples, based on a particular fault condition, the diagnostic system 160 can generate a set of fault commands 161 to attempt to resolve the fault condition. For example, the fault commands 161 can cause the faulty AV system to reset or power cycle, restore certain settings or parameters of the faulty AV system, alter the settings or parameters of the faulty AV system, run the faulty AV system in a degraded mode, or power down the faulty AV system. Further description of the diagnosis system 160 is provided below with respect to FIG. 2.

Figure 2:
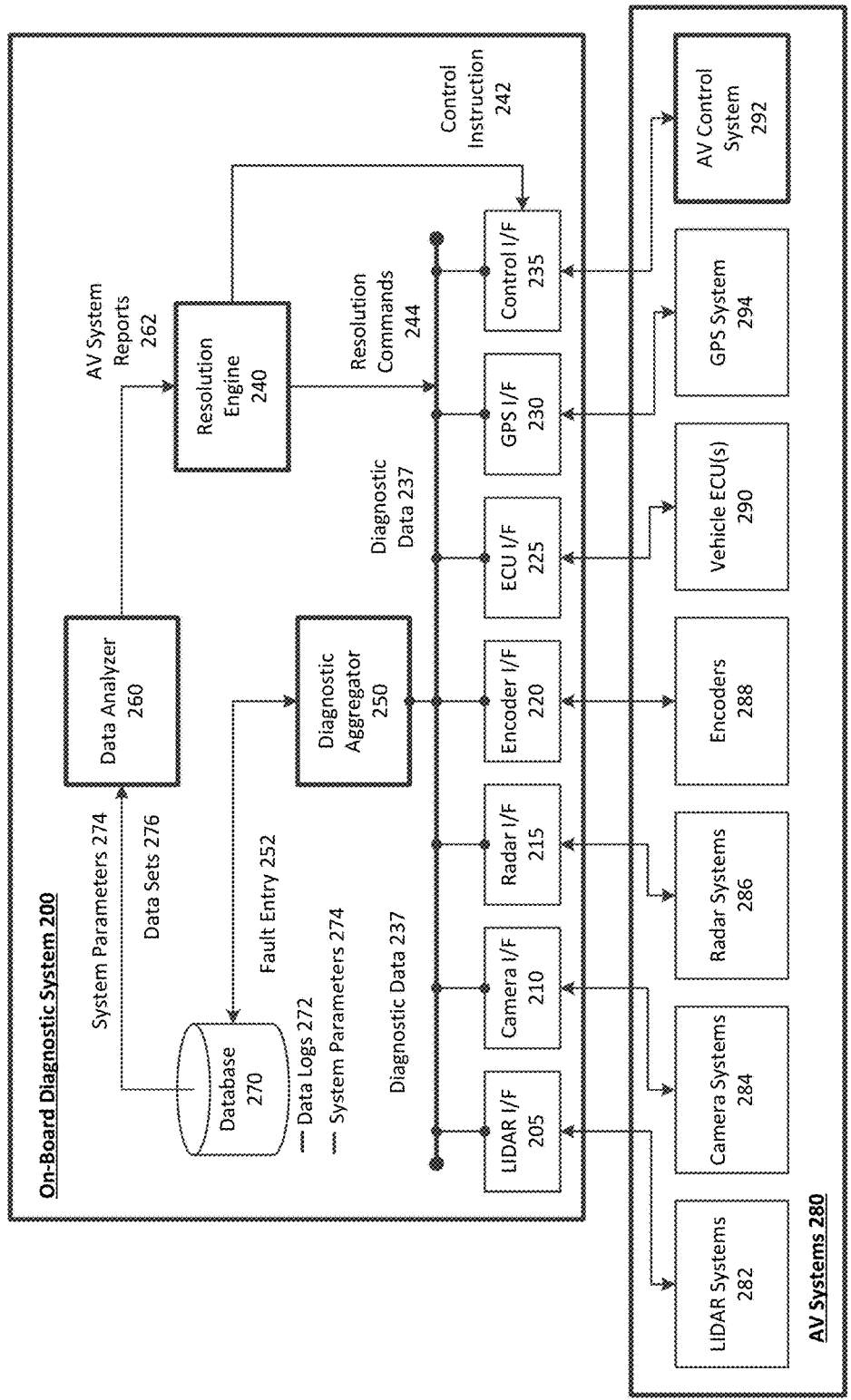
FIG. 2 is a block diagram illustrating an example on-board diagnostic system for an AV, according to examples described herein.

FIG. 2 is a block diagram illustrating an example on-board diagnostic system for an AV, according to examples described herein. The on-board diagnostic system 200 can correspond to the diagnostic system 160 as shown and described with respect to FIG. 1. Furthermore, as further described with respect to FIG. 1, the on-board diagnostic system 200 can receive and aggregate diagnostic data 237 from any number of AV systems 280. Referring to FIG. 2, these AV system 280 can include, but are not limited to, the AV's LIDAR systems 282, camera systems 284 (e.g., monocular and stereo cameras), radar systems 286, encoders 288, vehicle ECU(s) 290, GPS system 294, and the AV control system 292. Each of the AV systems 280 can include any number of components that provide diagnostic data 237 to a corresponding interface of the on-board diagnostic system 200. Thus, the on-board diagnostic system 200 can include a LIDAR interface 205, a camera system interface 210, a radar interface 215, an encoder interface 220, and ECU interface 225, a GPS system interface 230, and a control system interface 235, to receive the diagnostic data 237 from the various AV systems 280.

According to various implementations, the on-board diagnostic system 200 can include a diagnostic aggregator 250 that can receive the diagnostic data 237 from each of the interfaces, and parse the diagnostic data 237 based on the data source or the particular AV system 280 or component of that system from which the diagnostic data 237 originated. In certain examples, the diagnostic aggregator 250 can be encoded with logic or execute an instruction set that causes the diagnostic aggregator 250 to determine whether the diagnostic data 237 indicates that each of the AV systems 280 and components is operating nominally, or within a predetermined set of tolerance ranges. In variations, the diagnostic aggregator 250 can reference system parameters 274 in the database 270 to compare the diagnostic data 237 to the normal operational parameters of the specified AV system 280 or component thereof. The diagnostic aggregator 250 can further determine, from the received diagnostic data 237, whether any particular component of an AV system 280 has failed or is not operating properly. For each detected fault or failure condition, the diagnostic aggregator 250 can generate a fault entry 252 specifying the component and the nature of the fault condition, and log the fault entry 252 in the data logs 272.

For example, the diagnostic data 237 received from the AV control system 292 can include cooling system temperature data indicating an exit temperature of cooling fluid running through a computer rack of the AV control system 292. The diagnostic aggregator 250 can identify the normal operating temperature range for the cooling fluid and certify that the exit temperature is within the normal operating temperature range. In further examples, the diagnostic data 237 can include fluid pump data indicating whether each of the fluid pumps for the cooling system is working properly. If the fluid pump data indicates a pump failure, the diagnostic aggregator 250 can generate a fault entry 252 for the failed fluid pump and log the fault entry 252 in the data logs 272.

In many examples, the on-board diagnostic system 200 can further include a data analyzer 260 that can analyze the fault entries 252 in the data log 272. Specifically, the data analyzer 260 can access data sets 276 from the data logs 272, and system parameters 274 corresponding to a failed or faulty component of an AV system 280. In some aspects, the fault entry 252 for a system component (e.g., a LIDAR motor) can specify a unique identifier for that component. The data analyzer 260 can look up the system parameters 274 for the component in the database 270 to determine the nature of the fault condition. For example, the fault entry 252 can indicate that the spin rate of the LIDAR is lower than normal. The data analyzer 260 can perform a lookup of the LIDAR motor parameters to determine a source for the fault condition. The fault source can comprise a faulty bearing, insufficient power, or a malfunction in the motor (e.g., low resistance, over-current, overheating, moisture, dirt, excessive vibration, etc.). If one or more sources for the fault condition are identified, the data analyzer 260 can generate an AV system report 262 indicating the fault source, and submit the AV system report 262 to a resolution engine 240 of the on-board diagnostic system 200.

The resolution engine 240 can process the AV system report 262 to determine whether a particular fault condition can be resolved, mitigated, or ignored, or whether the fault condition is critical to the safe operation of the SDV. In determining whether the fault condition is resolvable, the resolution engine 240 can implement a safety or troubleshoot procedure for the specific faulty component. In some examples, such as a detected leak in a tire, the safety or troubleshoot procedure can comprise monitoring the tire pressure to determine whether immediate operation of the SDV is safe (e.g., by determining a pressure loss rate). If so, the resolution engine 240 can generate a control instruction 242 for the AV control system 292 indicating the tire leak and a low urgency level for repairing the tire. The AV control system 292 can travel to a destination to make a drop off or fulfill some current obligation before driving the SDV to a servicing station to repair the tire. In various examples, the AV control system 292 can further provide information corresponding to the fault condition to a passenger of the vehicle, and enable the passenger to decide whether to pull the vehicle over immediately, or whether it is safe to continue driving. However, if the tire has little or no pressure, then the resolution engine 240 can generate an emergency control instruction 242 commanding the AV control system 292 to pull the vehicle over or drive directly to a proximate service station.

According to examples provided herein, the nature of the response by the resolution engine 240 is specific to the faulty component or AV system 280 and the nature of the fault condition (e.g., a CPU crash). For certain fault conditions, the resolution engine 240 may generate resolution commands 244 in order to resolve, troubleshoot, or mitigate the fault condition. In some examples, the resolution commands 244 can be executed by the faulty AV system 280 to resolve the fault condition. For example, the diagnostic aggregator 250 may log a fault entry 252 for a camera of the camera system 284. The data analyzer 260 may analyze the data set 276 identifying the fault entry 252 and determine the source of the fault (e.g., a lens setting error, lens connection error, battery error, etc.). The data analyzer 260 can generate an AV system report 262 for the camera system 284 identifying the faulty camera and the source of the fault condition. The resolution engine 240 can process the AV system report 262 to initiate a troubleshoot process to attempt to resolve the fault condition.

In implementing the troubleshoot process, the resolution engine 240 can identify or otherwise access resources indicating the appropriate actions specific to the faulty component. For example, the resolution engine 240 can initially attempt to resolve a lens setting error for a specified camera of the camera system 284 by power cycling the faulty camera. If the fault condition persists, the resolution engine 240 can implement a next step in the troubleshoot process by, for example, generating a set of resolution commands 244 that cause the camera system 284 to adjust the lens settings to proper specifications for the SDV. If the fault condition still persists, the resolution engine 240 can implement a next step, such as determining whether the fault source lies elsewhere in the camera system 284 (e.g., a failed lens motor). In some examples, the resolution engine 240 may determine that the fault condition is not resolvable, and instead determine whether the fault condition can be mitigated.

As an example, a faulty lens on a camera can cause the AV control system 292 to utilize additional processing resources in order to attempt to positively identify objects, features, pedestrians, obstacles, and other hazards in the image data from the faulty camera. This can effectively cause the AV control system 292 to delay control commands for autonomous operation of the SDV, and thus cause the progress of the SDV along a current route to slow. To mitigate theses effects cause by the faulty camera, the resolution engine 240 can generate resolution commands 244 that cause the AV control system 292 to disregard image data from the faulty camera and/or prioritize image data from other cameras. In some examples, the resolution engine 240 may instruct the AV control system 292 to prioritize sensor data from other sensor systems (e.g., the LIDAR systems 282 or radar systems 286) in order to mitigate the fault condition of the camera. Thus, in general, based on the nature of the fault condition and the troubleshoot or safety procedure for the faulty AV system 280, the resolution engine 240 can initially attempt to resolve the fault condition—which can involve any number of hierarchical steps—and if unsuccessful, the resolution engine 240 can perform a number of steps to attempt to mitigate the effects of the fault condition.

For certain critical AV systems 280, if the fault condition cannot be resolved or mitigated (e.g., a tire failure, a LIDAR system failure at night, or a GPS failure that renders route planning impossible), the resolution engine 240 can override a current plan by the AV control system 292 with a control instruction 242 instructing the AV control system 292 to drive the SDV to a home location (e.g., the owner's home or a central storage or parking location, etc.), a service station for technical or mechanical servicing, to pull over at the nearest safe location on a current road, or to hand over control of the vehicle to a human operator. This recovery mode of the SDV can be initiated after attempts to resolve or mitigate fault conditions for certain critical AV systems 280 fail. In some examples, if a fault condition is deemed critical, the on-board diagnostic system 200 can determine whether a passenger is in the traditional driver's seat of the SDV, and signal an alert indicating the fault condition to the passenger. Depending on the fault condition, the on-board diagnostic system 200 can attempt to hand over operational control of the SDV to the passenger. For example, if it is a perception fault, planning fault, or a fault with autonomous operation of the acceleration, braking, and/or steering systems—or any fault that can be readily resolved by a human driver—the on-board diagnosis system 200 can initiate a hand-off procedure to safely hand over control of the vehicle to the human driver.

In accordance with certain examples, the diagnostic aggregator 250 can classify each fault entry 252 based on the seriousness of the fault command and/or the importance of the AV system 280 or system component to the safe operation of the SDV. In one aspect, the diagnostic aggregator 250 can dual classify fault entries 252 based on (i) the importance of the faulty AV system 280 to autonomous operations, and (ii) the effect of the fault condition on the operative ability of the faulty AV system 280. For example, the diagnostic aggregator 250 can classify a single photodetector misalignment on one of the SDV's LIDAR systems 282 as relatively minor to the overall operation of the SDV. In further examples, the diagnostic aggregator 250 can include additional factors in classifying the fault entry 252, such as a time of day (e.g., nighttime failure of the LIDAR system 282 may be classified as more critical than daytime failure), whether a passenger is within the vehicle, the state of the SDV's surroundings (e.g., crowded, urban, rural, uncrowded, complex streets and intersections, pedestrian activity, etc.), proximity to a current destination or servicing location, and the like.

Accordingly, the on-board diagnostic system 200 can monitor each of the AV systems 280 in accordance with nominal operational parameters, and can further log fault entries 252 in the data logs 272 when a particular component of a specific AV system 280 operates outside such parameters, fails completely, or causes stress or additional load on other components, such as the AV control system 292. When the SDV is being serviced, a technician can access the data logs 272 to identify each of the fault entries 252 such that the SDV may be manually reconfigured, recalibrated, or otherwise serviced in order to resolve all fault conditions with the AV systems 280. In some examples, servicing the SDV can include running external test simulations to confirm that the fault condition will be resolved prior to deploying the SDV back onto public roads and highways. Furthermore, even if the resolution engine 240 has succeeded in resolving or mitigating certain fault conditions, technician servicing of the SDV can make sure that the manufacturer settings (or other optimal settings) for each of the AV systems 280 of the SDV are implemented prior to redeploying the SDV.

Methodology

Figure 3:
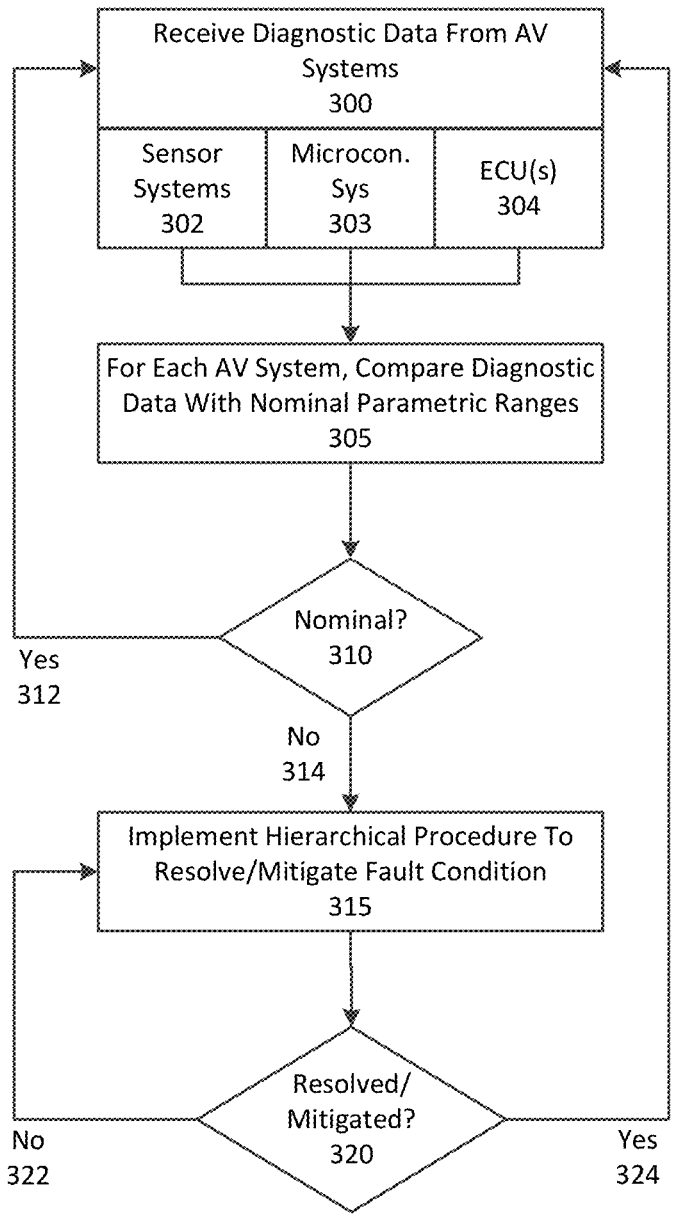
FIG. 3 is a flow chart describing an example method of monitoring and managing AV systems, according to examples described herein.

FIG. 3 is a flow chart describing an example method of monitoring and managing AV systems, according to examples described herein. In the below discussion of FIG. 3, reference may be made to reference characters representing like features as shown and described with respect to FIGS. 1 and 2. Furthermore, the below processes described with respect to FIG. 3 may be performed by an example on-board-diagnostic system 160, 200 as shown and described in connection with FIGS. 1 and 2. Referring to FIG. 3, the diagnostic system 200 can receive diagnostic data 237 from the AV systems 280 (300). For example, the diagnostic system 200 can generally receive diagnostic data 237 from the SDV's sensor systems 102 (302), the microcontrollers of the AV control system 120 (303), and the ECU(s) 180 of the SDV 100 (304). The diagnostic data 237 can indicate the diagnostics of pertinent operational components of each of the AV systems 280.

For each AV system 280, the diagnostic system 200 can compare the diagnostic data 237 with nominal parametric ranges for that AV system 280 (305). In some examples, the diagnostic system 200 can readily determine if a component has failed (e.g., receiving no check signal from the component). Additionally, the diagnostic system 200 can identify that an AV system 280 is working, but that a particular component has been compromised. Thus, the diagnostic system 200 can determine whether the respective AV system 280 is nominal (310). If so, (312), then the diagnostic system 200 can continue to receive diagnostic data 237 from the respective AV system 280 (300).

However, if the respective AV system 280 is not nominal (314) (i.e., a fault condition exists), then the diagnostic system 200 can implement a hierarchical procedure to attempt to resolve or mitigate the fault condition (315). After each step of the hierarchical procedure, the diagnostic system 200 can determine whether the fault condition has been resolved or mitigated (320). If so (324), then the diagnostic system 200 can continue to receive diagnostic data 237 from the respective AV system 280 (300). However, if the fault condition has not been resolved or mitigated (322), then the diagnostic system 200 can continue implementing the hierarchical procedure to attempt to resolve or mitigate the fault condition (315).

According to examples described, each particular component of the respective AV system 280 from which diagnostic data 237 is received can be associated with a specified troubleshoot process. As an example, a single LIDAR sensor of the SDV 100 can provide diagnostic data 237 for several of its components, such as the spin motor, laser, photodetectors, processing resources, and the power supply. Each of these components can be associated with its own troubleshoot process. In further variations, the troubleshoot process can depend on the specific nature of the fault condition for each component of the respective AV system 280. Thus, a relatively wide variety of hierarchical or troubleshoot procedures, each associated with a specific fault condition of a specific AV system component, can be accessed by the diagnostic system 200 in attempting to resolve such fault conditions.

Figure 4:
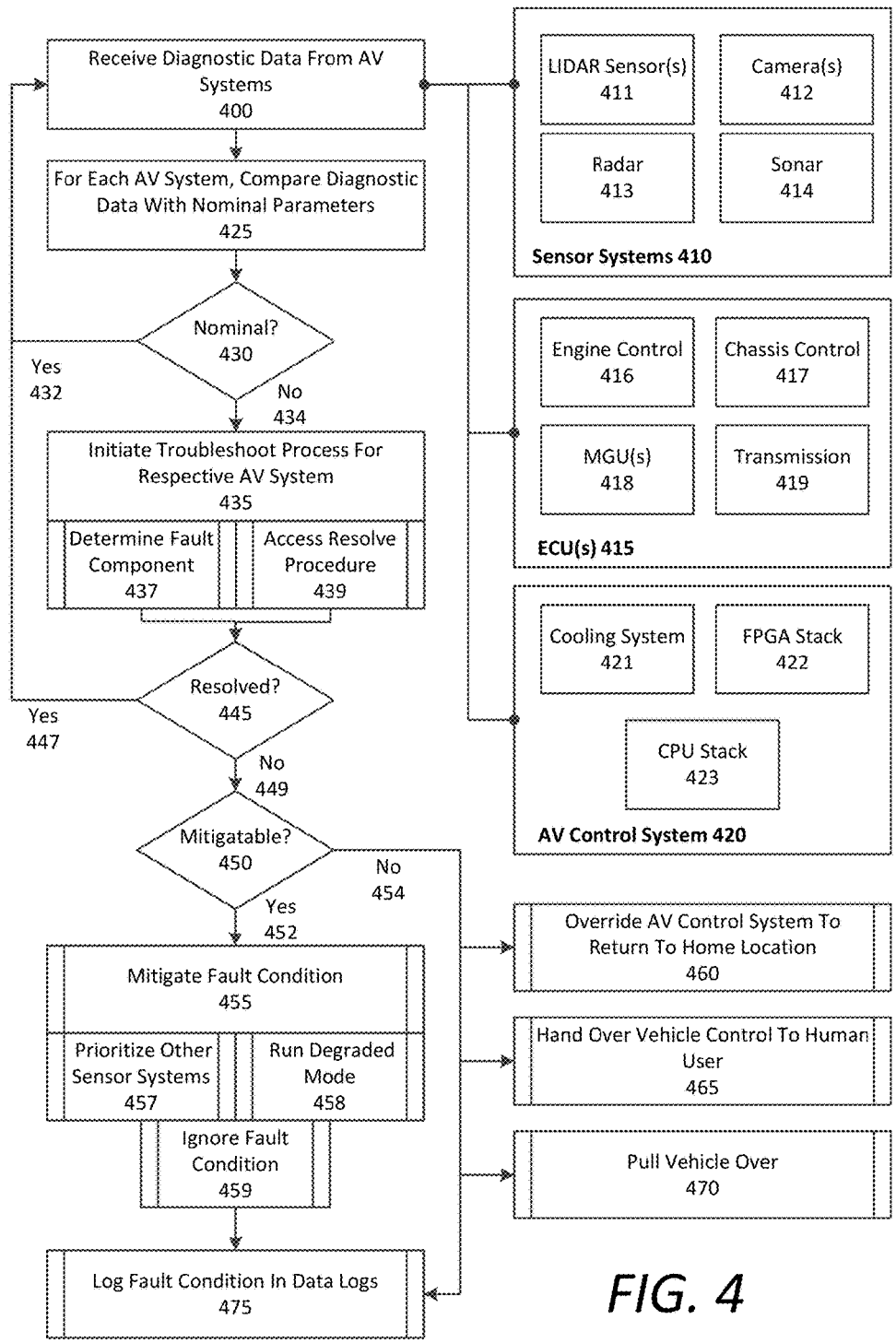
FIG. 4 is another flow chart describing an example method of monitoring and managing AV systems, according to examples described herein.

FIG. 4 is another flow chart describing an example method of monitoring and managing AV systems, according to examples described herein. In the below discussion of FIG. 4, reference may be made to reference characters representing like features as shown and described with respect to FIGS. 1 and 2. Furthermore, the below processes described with respect to FIG. 4 may be performed by an example on-board-diagnostic system 160, 200 as shown and described in connection with FIGS. 1 and 2. Referring to FIG. 4, the diagnostic system 200 can receive diagnostic data 237 from respective AV systems 280 (400). Specifically, the diagnostic system 200 can generally receive diagnostic data 237 from the SDV's sensor systems 102 (410), such as the LIDAR sensor(s) (411), the cameras (412), the radar system (413), and/or the sonar system (414). In additional variations, the sensor systems 102 can further include proximity sensors, infrared sensors, or any other type of suitable sensor for aiding in SDV perception.

The diagnostic system 200 can further generally receive diagnostic data 237 from the AV control system 292 (420). Accordingly, the diagnostic system 200 can receive diagnostic data 237 from the control system's cooling system (421), such as temperature data, pump operation data, fluid line pressure data, and/or power supply data. Additionally or alternatively, the diagnostic system 200 can receive diagnostic data 237 from the control system's FPGA stack (422) and/or CPU stack (423). Such diagnostic data 237 can indicate FPGA or CPU performance or processing load. In some examples, individual FPGA modules or CPU modules can be dedicated to processing sensor data from individual sensor systems. For example, a specific set of FPGA modules may be solely dedicated to processing LIDAR data from the SDV's primary LIDAR system 282 (e.g., on the roof of the SDV 100). The diagnostic data 237 from these dedicated FPGA modules can indicate whether the performance of the primary LIDAR system has been degraded or otherwise compromised.

In still further examples, the diagnostic system 200 can further receive diagnostic data 237 from the SDV's electronic control unit(s) 180 (415). For example, the diagnostic data 237 can comprise data from the engine control unit (416), the chassis control systems (417), the motor generator units (418), the transmission (419), and various other operative systems 155 of the SDV. In some examples, the SDV 100 may not include dedicated ECUs 180 for the operative systems 155. In such examples, the diagnostic system 200 can directly receive the diagnostic data 237 from each of the operative systems 155, serving as the centralized ECU for all of the operative systems 155. In any case, as provided herein, these operative systems 155 can include the SDV's engine or electrical motor, transmission, fuel/power delivery system 152, motor generator systems (e.g., kinetic energy recovery system, exhaust heat recovery system, power deployment systems, etc.), steering system 154, braking system 156, lighting and auxiliary systems 158, tire pressure sensors, media control unit, other interior interfaces, seat control, blind spot detection system, communications systems, speed control unit, hydraulic pressure sensors, engine/motor cooling system, air conditioning system, battery or battery pack, battery pack cooling system, and the like. Furthermore, the diagnostic system 200 can receive diagnostic data 237 from each pertinent component of each of the foregoing operative systems 155.

According to examples described herein, the diagnostic system 200 can compare the diagnostic data 237 from each respective AV system 280 with that AV system's nominal parameters (425), and determine whether the respective AV system 280 is operating nominally (430). If so (432), then the diagnostic system 200 can continue to receive diagnostic data 237 from the respective AV system 280 (400). However, if the respective AV system 280 is not operating nominally (434), then the diagnostic system can initiate a troubleshoot process for the respective AV system 280 (435). In doing so, the diagnostic system 200 can determine the component of the faulty AV system 280 that is responsible for the fault condition (437), and access the resolve procedure, or hierarchical troubleshoot procedure, for that particular component (439). In further examples, the faulty component may be associated with multiple troubleshoot procedures depending on the particular type of fault.

As an illustration, the diagnostic aggregator 250 can identify that the primary LIDAR sensor is spinning too slowly, and can log a fault entry 252 indicating this fault condition. The fault condition for the LIDAR system spin motor can be caused by a motor failure, a bearing failure, dirt, moisture, a power surge, etc. The diagnostic system 200 can analyze the diagnostic data 237 from the LIDAR spin motor to converge on a particular cause. For example, the diagnostic data 237 can indicate an asymmetric spin rate for the spin motor, which can indicate a problem with the bearing. As another example, the diagnostic data 237 can indicate an even spin, but insufficient power delivery to the spin motor, which can indicate a connection issue or a power supply issue. Each particular fault condition type can be associated with a troubleshoot process, which the diagnostic system 200 can access and implement once the faulty component and condition type are determined.

Furthermore, after each step in implementing the troubleshoot process for the faulty AV system 280, the diagnostic system 200 can determine whether the fault condition has been resolved (445). For example, the diagnostic system 200 can initially reset or otherwise cycle the power of the faulty AV system component. If the fault condition is resolved (447), then the diagnostic system 200 can resort to once again receiving diagnostic data 237 from the respective AV system 280 (400). However, if each of the specified troubleshooting steps has not resolved the fault condition (449), then the diagnostic system 200 can determine whether the fault condition can be mitigated (450). In making this determination, the diagnostic system 200 can classify the fault condition based on the importance of the respective AV system 280 to autonomous operation of the SDV, and a criticality level of the fault condition (e.g., an degree to which the fault condition affects autonomous control of the SDV). For example, a minor bulb failure in the SDV's lighting system 158 in the daytime will have no effect on the AV control system's 292 ability to autonomously operate the SDV. Thus, the diagnostic system 200 can determine that the bulb failure can be ignored outright, and log the fault condition in the data logs 272 accordingly.

As another example, a failure of a single camera in the SDV's camera systems 284 can be analyzed by the diagnostic system 200. In one aspect, the diagnostic system 200 can determine the effect of the camera failure on the AV control system's 292 ability to autonomously operate the SDV. If the camera failure causes the AV control system 292 to slow down slightly, but otherwise continue to operate effectively, then the diagnostic system 200 can determine that the fault condition of the failed camera can be mitigated. Thus, in some examples, the diagnostic system 200 can generate a set of resolution commands 244 to cause the AV control system 292 to disregard image data from the failed camera and prioritize sensor data from other cameras or sensor systems (e.g., the LIDAR systems 282). Furthermore, in general, the diagnostic system can classify the fault condition (e.g., minor, moderate, critical) to determine whether the fault condition can be mitigated (450). If so (452), the diagnostic system 200 can generate resolution commands 244 executable by the AV control system 292, or other AV systems 280, to mitigate the fault condition (455). In doing so, the diagnostic system 200 can cause the AV control system 292 to prioritize sensor data from other sensor systems 102 (457), run the faulty AV system in a degraded mode (458), or ignore the fault condition outright (459).

However, if the fault condition cannot be mitigated (454), then the diagnostic system 200 can determine a course of action depending on the classification of the fault condition, such as initiating a sequence of safety operations to respond to the fault condition. For example, if the fault condition has to do with perception or planning (e.g., a sensor failure or control system failure), then the diagnostic system 200 can determine that autonomous operations have been compromised. Depending on the degree to which the autonomous operations have been compromised (e.g., perception and planning by the AV control system 292), the diagnostic system 200 can generate control instructions 242 that can override a current plan of the AV control system 292 in order to cause the AV control system 292 to drive the SDV 100 to a home location (460), initiate a hand-off process to hand control of the vehicle over to a human driver (465), or cause the AV control system 292 to immediately pull the SDV 100 over (470).

Furthermore, for each detected fault condition, the diagnostic system 200 can log the fault condition in data logs 272 of the SDV 100 (475). Thus, when the data logs 272 of the SDV 100 are analyzed by a technician, each of the fault conditions can be readily identified in order to, for example, resolve component and/or processing issues during servicing, and potentially improve the design of such components and/or provide a software patch to update the AV control system 292.

Hardware Diagrams

Figure 5:
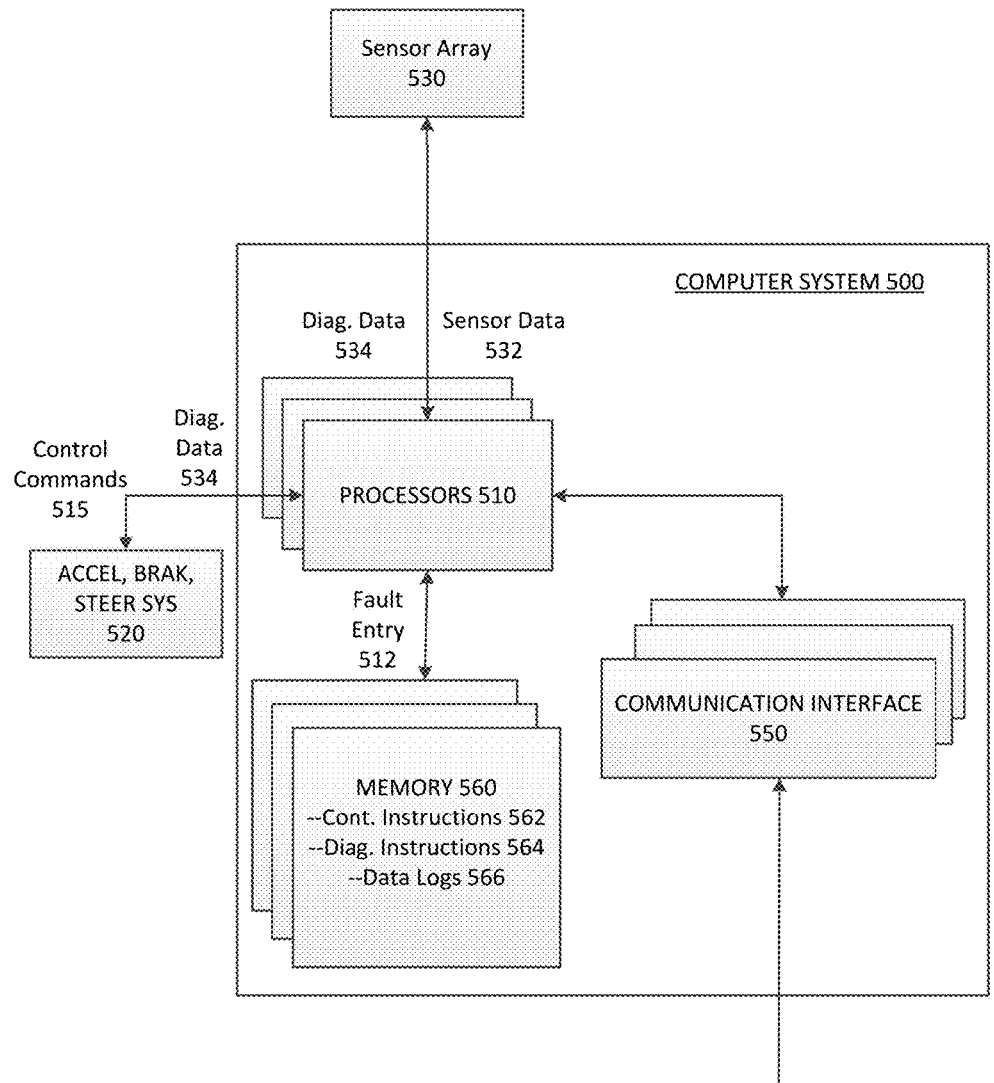
FIG. 5 is a block diagram illustrating a computing system for an AV or SDV upon which examples described herein may be implemented.

FIG. 5 is a block diagram illustrating a computer system upon which example SDV processing systems described herein may be implemented. The computer system 500 can be implemented using one or more processors 504, and one or more memory resources 560. In the context of FIGS. 1 and 2, the control system 120, 292 and the diagnostic system 160, 200 can be implemented using one or more components of the computer system 500 shown in FIG. 5.

According to some examples, the computer system 500 may be implemented within an autonomous vehicle or self-driving vehicle (SDV) with software and hardware resources such as described with examples of FIGS. 1 and 2. In an example shown, the computer system 500 can be distributed spatially into various regions of the SDV, with various aspects integrated with other components of the SDV itself. For example, the processors 510 and/or memory resources 560 can be provided in a cargo space of the SDV. The various processing resources 510 of the computer system 500 can also execute control instructions 562 using microprocessors or integrated circuits. In some examples, the control instructions 562 can be executed by the processing resources 560 or using field-programmable gate arrays (FPGAs).

In an example of FIG. 5, the computer system 500 can include a communication interface 550 that can enable communications over a network 560. In one implementation, the communication interface 550 can also provide a data bus or other local links to electro-mechanical interfaces of the vehicle, such as wireless or wired links to and from the SDV control system 120, sensor interfaces 110, 112, 114 and can provide a network link to a backend transport management system over one or more networks 560.

The memory resources 560 can include, for example, main memory, a read-only memory (ROM), storage device, and cache resources. The main memory of memory resources 560 can include random access memory (RAM) or other dynamic storage device, for storing information and instructions which are executable by the processors 510. The processors 510 can execute instructions for processing information stored with the main memory of the memory resources 560. The main memory 560 can also store temporary variables or other intermediate information which can be used during execution of instructions by one or more of the processors 510. The memory resources 560 can also include ROM or other static storage device for storing static information and instructions for one or more of the processors 510. The memory resources 560 can also include other forms of memory devices and components, such as a magnetic disk or optical disk, for purpose of storing information and instructions for use by one or more of the processors 510.

According to some examples, the memory 560 may store a set of software instructions including, for example, control instructions 562 and diagnostic instructions 564. The memory 560 may also store data logs 566 in which the processors 510—executing the diagnostic instructions 564—can log fault entries 512, as described in detail above. The control instructions 562 may be executed by one or more of the processors 510 in order to autonomously operate the SDV's acceleration, braking, and steering systems 520. In doing so, the processors 510 can operate the acceleration, braking, and steering systems 520 along a current route, either determined locally via a mapping resource, or via information from a remote source. Thus, in executing the control instructions 562, the processor(s) 510 can receive sensor data 532 from the sensor array 530 to dynamically generate control commands 515 to autonomously operate the acceleration, braking, and steering systems 520 of the SDV through road traffic on roads and highways.

The diagnostic instructions 564 can be executed by the processors 510 to monitor and/or analyze diagnostic data 534 from various AV systems and system components. As shown in the example of FIG. 5, the diagnostic data 534 can be received from individual sensors in the SDV's sensor array 530, the SDV's acceleration, braking, and steering systems 520, and various other components of the SDV as shown and described with respect to FIGS. 1-4.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. An on-board diagnostic system for an autonomous vehicle (AV) comprising:
    at least one AV systems interface connecting the on-board diagnostic system with a plurality of AV systems;
    one or more processors; and
    one or more memory resources storing instructions that, when executed by the one or more processors, cause the one or more processors to:
        receive, via the at least one AV systems interface, diagnostic data from the plurality of AV systems;
        for each respective AV system of the plurality of AV systems, determine whether the diagnostic data indicate that the respective AV system is operating nominally; and
        in response to determining a fault condition corresponding to the respective AV system not operating nominally, initiate a procedure associated with the respective AV system to resolve or mitigate the fault condition by:
            controlling one or more sensors or actuators to reset the respective AV system;
            determining whether resetting the respective AV system resolves the fault condition;
            based on determining that resetting the respective AV system does not resolve the fault condition, determining whether the fault condition for the respective AV system can be mitigated; and
            based on determining that the fault condition can be mitigated, controlling one or more sensors or actuators to mitigate the fault condition in accordance with the procedure associated with the respective AV system.

2. The on-board diagnostic system of claim 1, wherein the plurality of AV systems comprises a plurality of sensor systems of the AV.

3. The on-board diagnostic system of claim 2, wherein the plurality of sensor systems comprises at least a LIDAR sensor system and a stereoscopic camera sensor system.

4. The on-board diagnostic system of claim 3, wherein the executed instructions cause the one or more processors to determine whether the diagnostic data indicate that the LIDAR sensor system is operating nominally by comparing the diagnostic data from the LIDAR sensor system with a set of tolerance ranges for each of a plurality of components on the LIDAR sensor system.

5. The on-board diagnostic system of claim 4, wherein the set of tolerance ranges for the LIDAR sensor system include at least one of a spin rate range, a laser power range, a laser frequency range, or a photodetector alignment range.

6. The on-board diagnostic system of claim 2, wherein the plurality of sensor systems further comprises a radar sensor system.

7. The on-board diagnostic system of claim 2, wherein the plurality of AV systems further comprises a positioning system.

8. The on-board diagnostic system of claim 2, wherein the plurality of AV systems further comprises an AV control system that processes sensor data from the plurality of sensor systems in order to autonomously operate acceleration, braking, and steering systems of the AV along a current route.

9. The on-board diagnostic system of claim 8, wherein the fault condition affects autonomous operations of the AV control system, and wherein the executed instructions further cause the one or more processors to:
    classify the fault condition based on a degree to which the fault condition affects the autonomous operations; and
    implement a sequence of safety operations in the procedure in response to the fault condition.

10. The on-board diagnostic system of claim 9, wherein the sequence of safety operations comprises a transfer procedure to hand over control of the AV to a human driver.

11. The on-board diagnostic system of claim 10, wherein the executed instructions further cause the one or more processors to:
    log the fault condition in one or more data logs of the AV.

12. The on-board diagnostic system of claim 9, wherein the sequence of safety operations comprises causing the AV control system to autonomously drive the AV to a home location.

13. The on-board diagnostic system of claim 9, wherein the sequence of safety operations comprises causing the AV control system to stop the AV at a nearest safe location.

14. The on-board diagnostic system of claim 9, wherein the autonomous operations comprise at least one of perception operations or planning operations by the AV control system.

15. The on-board diagnostic system of claim 14, wherein the affected perception operations indicate a failure in a faulty sensor system, and wherein the executed instructions further cause the one or more processors to:
   in response to identifying the failure in the faulty sensor system, cause the AV control system to disregard sensor data from the faulty sensor system.

16. The on-board diagnostic system of claim 1, wherein the plurality of AV systems comprises at least one electronic control unit of the AV.

17. A non-transitory computer readable medium storing instructions that, when executed by one or more processors of an on-board diagnostic system of an autonomous vehicle (AV), cause the one or more processors to:
   receive, via at least one AV systems interface connecting the on-board diagnostic system with a plurality of AV systems, diagnostic data from the plurality of AV systems;
   for each respective AV system of the plurality of AV systems, determine whether the diagnostic data indicate that the respective AV system is operating nominally; and
   in response to determining a fault condition corresponding to the respective AV system not operating nominally, initiate a procedure associated with the respective AV system to resolve or mitigate the fault condition by:
      controlling one or more sensors or actuators to reset the respective AV system;
      determining whether resetting the respective AV system resolves the fault condition;
      based on determining that resetting the respective AV system does not resolve the fault condition, determining whether the fault condition for the respective AV system can be mitigated; and
      based on determining that the fault condition can be mitigated, controlling one or more sensors or actuators to mitigate the fault condition in accordance with the procedure associated with the respective AV system.

18. A computer-implemented method of performing diagnostics on an autonomous vehicle (AV), the method being performed by one or more processors of an on-board diagnostic system of the AV and comprising:
   receiving, via at least one AV systems interface connecting the on-board diagnostic system with a plurality of AV systems, diagnostic data from the plurality of AV systems of the AV;
   for each respective AV system of the plurality of AV systems, determining whether the diagnostic data indicate that the respective AV system is operating nominally; and
   in response to determining a fault condition corresponding to the respective AV system not operating nominally, initiating a procedure associated with the respective AV system to resolve or mitigate the fault condition by:
      controlling one or more sensors or actuators to reset the respective AV system;
      determining whether resetting the respective AV system resolves the fault condition;
      based on determining that resetting the respective AV system does not resolve the fault condition, determining whether the fault condition for the respective AV system can be mitigated; and
      based on determining that the fault condition can be mitigated, controlling one or more sensors or actuators to mitigate the fault condition in accordance with the procedure associated with the respective AV system.

* * * * *